United States Patent [19]

Watson

[11] Patent Number: 5,119,278
[45] Date of Patent: Jun. 2, 1992

[54] COURTESY LIGHT FOR A VEHICLE

[76] Inventor: George W. Watson, 6 Ember Way, Cartersville, Ga. 30120

[21] Appl. No.: 500,875

[22] Filed: Mar. 29, 1990

[51] Int. Cl.⁵ .............................................. B60Q 1/00
[52] U.S. Cl. ..................................... 362/80; 362/82; 40/588; 340/470
[58] Field of Search .................... 362/80, 82, 371, 812, 362/83.2; 40/588, 590, 591; 340/470, 467

[56] References Cited

U.S. PATENT DOCUMENTS

| | | | |
|---|---|---|---|
| 1,339,167 | 5/1920 | Condran | 362/82 |
| 2,491,179 | 1/1950 | King | 40/591 |
| 2,503,336 | 4/1950 | Hines | 340/470 |
| 2,517,173 | 8/1950 | Blasingame | 340/470 |
| 2,605,338 | 7/1952 | Miller et al. | 340/470 |
| 2,851,674 | 9/1958 | Boone | 340/470 |

FOREIGN PATENT DOCUMENTS

| | | | |
|---|---|---|---|
| 748297 | 12/1966 | Canada | 362/80 |
| 1091885 | 9/1954 | Fed. Rep. of Germany | 362/80 |
| 1528591 | 10/1978 | United Kingdom | 40/591 |

Primary Examiner—James C. Yeung
Attorney, Agent, or Firm—John L. James

[57] ABSTRACT

A courtesy light is provided for tractor-trailer to flash a THANK YOU after passing a motor who indicates it is safe to return to the right hand lane of the road. The courtesy light is mounted on the bumper of the truck between the vertical members of the bumper and above the horizontal member of the bumper where it is easily seen by automobile drivers. The courtesy light is operated by a switch in the cab of the tractor-trailer and may flash a single time of predetermined duration or flash intermittently with a single operation of the switch.

8 Claims, 2 Drawing Sheets

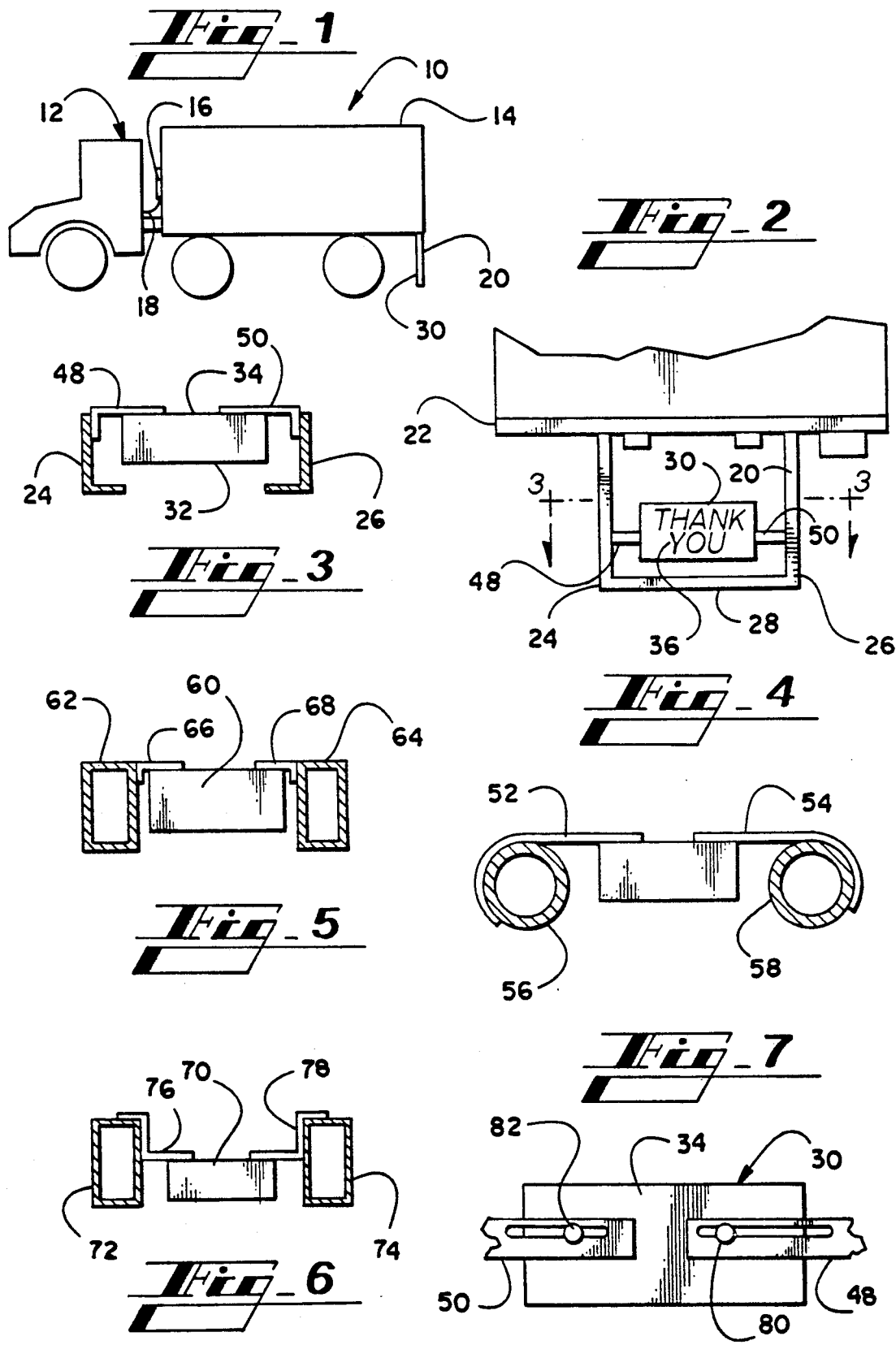

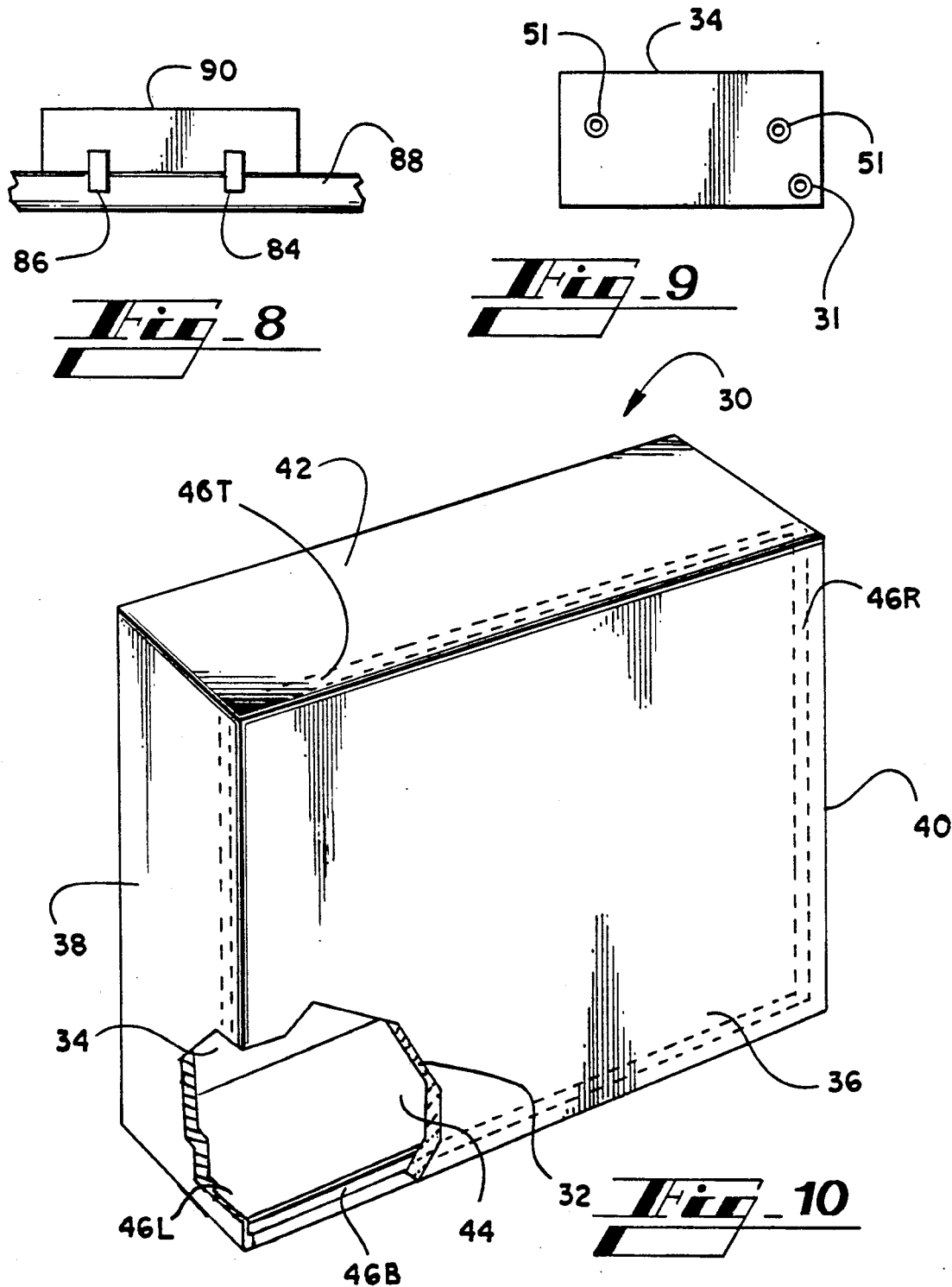

COURTESY LIGHT FOR A VEHICLE

TECHNICAL FIELD

This invention generally relates to an accessory item for a vehicle, and more particularly, to a courtesy light for a tractor-trailer.

BACKGROUND OF THE INVENTION

Drivers of large trucks, particularly trucks with trailers, such as the eighteen wheel vehicles used to transport goods over highways, have their vision partially blocked by the body or trailer of the vehicle. To provide for the orderly flow of traffic, trucks typically use the right hand lane of the road except when passing or turning. When a large truck passes another vehicle, the driver tries to return to the right hand lane as quickly as possible. Doing so keeps the driver aware of his surroundings because it minimizes the possibility that a vehicle can approach from the rear in the right hand lane in a blind spot of the truck driver thereby creating a hazardous condition.

A courteous driver will flash his headlights momentarily or switch from low beam to high beam to alert the truck driver that it is safe for the truck to return to the right hand lane. As a return courtesy, the driver of the truck will flash the trailer lights as a thank you for the driver giving the indication that it is safe to return to the right hand lane. The truck driver will typically operate a switch that causes the truck lights to flash momentarily.

Unfortunately, in many instances, flashing the trailer lights of a tractor-trailer also interrupts the circuit to the head lamps causing the headlights flash also. This flashing of the headlights can be annoying to oncoming vehicles and can cause the headlights to fail prematurely. Also, flashing the lights can cause a momentary power surge which decreases the useful life of the truck lights and can damage internal components of the vehicle electrical system. Accordingly, it will be appreciated that it would be highly desirable to acknowledge courteous drivers without subjecting the electrical system of the vehicle to damage and without causing premature failure of the lamps.

Some tractor trailers are equipped with tail lights on the trailer portion of the vehicle that can be operated by a switch by the driver to cause the tail lights to flash without engaging other lights in the electrical system. These lights work well at night and are highly visible at night, however, they are not as effective in day light. It is desirable to have a lighting system that is effective in day light as well as at night, and does not interfere with the remainder of the electrical system of the vehicle.

Another problem with lights on the trailer portion of the vehicle is that the lights are on the perimeter of the rear end of the trailer far above the eye level of drivers of passenger cars. Accordingly, it will be appreciated that it would be highly desirable to have a courtesy light that is near the eye level of drivers of passenger cars so that the courtesy light is more noticeable.

SUMMARY OF THE INVENTION

The present invention is directed to overcoming one or more of the problems set forth above. Briefly summarized, according to one aspect of the present invention, a light is provided for a vehicle. The vehicle has a frame and a bumper connected to the frame with first and second vertical members and a horizontal member connected to and extending between the vertical members. The light includes a housing that has front and rear panels, a display on the front panel, and means for controllably illuminating the display panel. The light also includes means for fastening the rear panel to the bumper of the vehicle. The display panel is controlled from a switch inside the cab of the vehicle that causes the sigh to flash a thank you message.

It is an object of the present invention to provide a courtesy light for a vehicle that can be positioned at the eye level of passenger car drivers.

Another object of the invention is to provide a courtesy light with a thank you message that is highly visible in day light as well as at night.

Another object of the invention is to provide a courtesy light that does not interfere with the remainder of the vehicle electrical system.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 1 is a diagrammatic side view of a tractor-trailer illustrating a preferred embodiment of a courtesy light in accordance with the present invention.

FIG. 2 is a rear view of a portion of the tractor-trailer of FIG. 1 further illustrating the courtesy light and rear bumper of the vehicle.

FIG. 3 is a diagrammatic sectional view of the bumper taken along line III—III of FIG. 2.

FIG. 4 is a sectional view similar to FIG. 3, but illustrating another embodiment.

FIG. 5 is a sectional view similar to FIGS. 3 and 4, but illustrating another embodiment.

FIG. 6 is a sectional view similar to FIGS. 3-5, but illustrating another embodiment.

FIG. 7 is rear view of the courtesy light illustrating connecting brackets.

FIG. 8 is a rear view of the courtesy light similar to FIG. 7, but illustrating another embodiment.

FIG. 9 is a rear view of the courtesy light illustrating rubber grommets for attaching to the bumper of the vehicle.

FIG. 10 is a perspective view of the courtesy light of FIG. 1 with a section cut away.

DETAILED DESCRIPTION OF THE PREFERRED EMBODIMENTS

Referring to FIG. 1, a truck, such as a tractor-trailer 10, has a cab 12 in which the driver sits, and a trailer 14 for transporting goods. The trailer 14 is equipped with numerous lights and other electrical devices which are wired to a connection block or box 16. The cab 12 is connected to the connection box 16 via a cable or harness 18. The connecting box 16 and cable 18 typically have unused or spare wires wired to a switch in the cab 12 that may be used for any number of purposes.

Referring to FIGS. 1 and 2, the trailer 14 has a bumper assembly 20. The bumper assembly 20 may be connected to the bed 22 of the trailer 14 or may be connected to the I-beams that run lengthwise under the bed 22 of the trailer 14. The bumper assembly 20 has a left vertical member 24 that is connected, preferably by welding but may be bolted, to the bed 22 or beam of the trailer 14. The bumper assembly 20 also has a right vertical member 26 that is spaced from the left vertical member 24 and similarly connected to the bed 22 or beam of the trailer 14. A horizontal member 28 extends between the left and right vertical members 24, 26, and is connected thereto, preferably by bolting, welding, or the like. The bumper 20 projects downwardly from the trailer 14 a preselected distance, and is useful to prevent the vehicle from backing over objects, especially when docking to load or unload. The vertical members 24, 26 and the horizontal member 28 may be constructed of I, L or channel shaped steel, or may be constructed of tubular steel.

Referring now to FIGS. 2, 7, 9 and 10, a courtesy or thank you light 30 consists of a housing having front and rear panels 32, 34 with a display panel 36 in the front panel 32. Preferably, the housing is sealed so that it is water tight and impervious to slush, salt and other road hazards. The rear panel 34 may be removable for access to the interior of the housing. The display 36 may be formed of a panel which, when lighted, reads THANK YOU. The display panel 36 may contain light emitting diodes or other devices which, when energized, will spell out a predetermined message. Wiring for the courtesy light 30 may exit through a rubber grommet 31 located in the rear panel 34 or on the top, bottom or sides of the housing as may be convenient. The rubber grommet 31 will ensure the integrity of the structure under all weather and road conditions.

Referring to FIG. 10, the courtesy light 30 is in the form of a closed rectangular box with the front and rear panels 32, 34 spaced apart to accommodate a lamp (not shown) for illuminating the display 36 to make the message visible. The courtesy light box 30 also has left and right vertical side panels 38, 40, and top and bottom horizontal panels 42, 44. The left and right vertical panels 38, 40 each have a lip or shoulder 46L, 46R offset from the front edge of its respective panel a distance sufficient to accommodate the front and display panels 32, 36 so that the front and display panels 32, 36 are preferably flush with the front edges of the vertical and horizontal panels 38, 40 and 42, 44. The top and bottom horizontal panels 42, 44 each also have a lip or shoulder 46T, 46B offset from the front edge of its respective panel a distance sufficient to accommodate the front and display panels 32, 36 so that the front and display panels 32, 36 are preferably flush with the front edges of the vertical and horizontal panels 38, 40 and 42, 44. The front panel 32 may be attached with screws with a gasket to seal the perimeter of the enclosure. Preferably, the front panel 32 is a red lens and the display panel 36 is a stick-on, light-blocking decal or adhesive backed material that is pressed onto the lens. A THANK YOU or other courtesy message is formed in the decal 36 so that the lens 32 is visible in the form of the message, and the message is readable when the lens 32 is illuminated. The plastic material used to cover brake lights on vehicles is suitable for the lens 32, and the material used for vehicle license plate decals is suitable for covering the lens 32.

Referring to FIGS. 3 and 9, the courtesy light 30 is equipped with left and right brackets 48, 50 attached to the housing, preferably the rear panel 34. The brackets 48, 50 are secured to the rear panel 34 with screws that may be inserted into rubber grommets 51 or may be threaded directly into the rear panel 34 with a suitable seal to prevent the egress of moisture and road contaminants. The brackets 48, 50 preferably have elongated slot through which the screws are positioned to allow the brackets 48, 50 to be moved inward or outward to accommodate various distances between the vertical members 24, 26.

As illustrated in FIG. 3, the brackets 48, 50 fit inside the L-shaped vertical members 24, 26. They may be fastened to the vertical members 24, 26 by bolts or screws or may be welded thereto. The courtesy light 30 and brackets 48, 50 are preferably finished to have a smooth, shiny appearance to simulate a chromium finish.

Referring to FIG. 4, an alternate embodiment is illustrated wherein the brackets 52, 54 fit around the outside of the vertical members 56, 58. In this configuration the vertical members 56, 58 are constructed of tubular steel and the brackets 52, 54 are curved to fit comfortably on the exterior circumference of the vertical members 56, 58. The brackets 52, 54 are preferably slotted so that adjustment can be made whereby the housing is held by the brackets 52, 54 and there is no need to weld, bolt or screw the brackets 52, 54 to the vertical members 56, 58.

Referring to FIG. 5, the courtesy light 60 is suspended between the vertical members 62, 64 which are constructed of box steel members with the brackets 66, 68 attached to the inside of the vertical box members 62, 64.

Referring to FIG. 6, the courtesy light 70 may be thinner than the vertical members 72, 74 so that brackets 76, 78 with an offset are required. As shown, the brackets 76, 78 are attached to the rear panels of the box shaped vertical members 72, 74, but it is understood that the brackets 76, 78 may be connected to the inside panels or the outside panels of the box shaped vertical members 72, 74 as an alternative.

Referring to FIG. 7, the left and right brackets 48, 50 are attached to the rear panel 34 of the courtesy light 30 with screws 80, 82. Each bracket has an elongated slot through which a screw is inserted. The brackets 48, 50 can be moved toward and from one another to facilitate attachment to the vertical members of the bumper. When positioned as desired, the screws 80, 82 are tightened to fasten the courtesy light 30 in place.

Referring to FIG. 8, an alternate embodiment is shown in which the brackets 84, 86 are attached to the horizontal member 88. The positioning of the housing 90 is generally not critical, but it is important that it is not placed so low that it is difficult for a driver of an automobile to see, or so high that it interferes with license plates or other required items that may be attached to the vehicle.

It will be now appreciated that there has been presented a courtesy light for a vehicle that enables a truck driver to acknowledge courteous automobile drivers without damaging the electrical system of the truck and without annoying oncoming vehicles. The courtesy light is effective in natural day light as well as at night. The courtesy light that is near the eye level of drivers of passenger cars so that is very noticeable.

While the invention has been described with reference to a tractor-trailer, it is apparent that the invention is easily adapted to other vehicles as well.

While the invention has been described with particular reference to a preferred embodiment, it will be understood by those skilled in the art that various changes may be made and equivalents may be substituted for elements of the preferred embodiment without departing from invention. For example, while the invention has been described as being constructed of metal with a chrome or shiny finish, it can be constructed of synthetic resins or plastic materials. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled the art. For example, messages other than thank you may be used and a single courtesy light may have more than one message. It is accordingly intended that the claims shall cover all such modifications and applications as do not depart from the true spirit and scope of the invention.

What is claimed is:

1. A courtesy light for a vehicle having a frame and a bumper connected to said frame with first and second vertical members and a horizontal member connected to and extending between said vertical members, comprising:
   a housing positioned above said horizontal member and having front and rear panels, said rear panel having first and second openings each fitted with a rubber grommet;
   first and second brackets attached to said rear panel via said rubber grommets fastening said housing to said bumper;
   a display on said front panel; and
   means for controllably illuminating said display.

2. A courtesy light, as set forth in claim 1, wherein said vertical members have curved contours and said brackets have curved end portions to conform to the contour of said vertical members.

3. A courtesy light, as set forth in claim 1, wherein said vertical members have rectangular cross sections and said brackets have angled end portions to conform to the rectangular contour of said vertical members.

4. A courtesy light, as set forth in claim 1, wherein said brackets each have a first flat portion attached to said rear panel and a second flat portion angularly offset from said first flat portion to thereby position said housing toward and from said vertical members.

5. A courtesy light for a vehicle, comprising:
   a rear panel;
   means for fastening said rear panel to said vehicle, said fastening means including first and second brackets attached to said rear panel and said vehicle;
   first, second, third and fourth panels connected to said rear panel forming an open box and defining an inner periphery;
   a shoulder on said inner periphery spaced from said rear panel;
   a front panel positioned on said shoulder and bounded by said inner periphery;
   means for fastening said front panel to said shoulder;
   a display positioned on said front panel; and
   means for controllably illuminating said display.

6. A courtesy light, as set forth in claim 5, wherein said brackets have curved end portions.

7. A courtesy light, as set forth in claim 5, wherein said brackets have angled end portions.

8. A courtesy light, as set forth in claim 5, wherein said brackets each have a first flat portion attached to said rear panel and a second flat portion angularly offset from said first flat portion to thereby position said rear panel toward and from said vehicle.

* * * * *